(12) United States Patent
Zewail et al.

(10) Patent No.: US 12,302,140 B2
(45) Date of Patent: May 13, 2025

(54) FREQUENCY TRACKING AND TIMING TRACKING USING WIDEBAND REFERENCE SIGNAL(S)

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Zhifei Fan, San Diego, CA (US); Jing Sun, San Diego, CA (US); Tao Luo, San Diego, CA (US); Wooseok Nam, San Diego, CA (US); Mohamed Fouad Ahmed Marzban, San Diego, CA (US); Qingjiang Tian, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/712,956

(22) Filed: Apr. 4, 2022

(65) Prior Publication Data

US 2022/0330061 A1    Oct. 13, 2022

Related U.S. Application Data

(60) Provisional application No. 63/171,517, filed on Apr. 6, 2021.

(51) Int. Cl.
*H04W 24/08* (2009.01)
(52) U.S. Cl.
CPC .................................. *H04W 24/08* (2013.01)
(58) Field of Classification Search
CPC .................................................... H04W 24/08
See application file for complete search history.

(56) References Cited

U.S. PATENT DOCUMENTS

2020/0367242 A1* 11/2020 Moon ........................ H04L 1/00
2022/0167321 A1*  5/2022 Zhang .................. H04L 5/0044

FOREIGN PATENT DOCUMENTS

WO    WO-2022129128 A1 *  6/2022 ........... H04L 5/0051

OTHER PUBLICATIONS

Ericsson: "Details on TRS Design", 3GPP Draft, 3GPP TSG-RAN WG1 Meeting #NR3, R1-1716375—Details on TRS Design, 3rd Generation Partnership Project (3GPP), Mobile Competence Centre, 650, Route Des Lucioles, F-06921, Sophia-Antipolis Cedex, France, vol. RAN WG1, no. Nagoya, Japan, Sep. 18, 2017-Sep. 21, 2017, Sep. 17, 2017 (Sep. 17, 2017), XP051339830, pp. 1-42, Retrieved from the Internet: URL: http://www.3gpp.org/ftp/Meetings_3GPP_SYNC/RAN1/Docs/ [retrieved on Sep. 17, 2017] the whole document.

(Continued)

*Primary Examiner* — Michael Thier
*Assistant Examiner* — Tracy Lauren Colbert
(74) *Attorney, Agent, or Firm* — Patterson & Sheridan, L.L.P/Qualcomm Incorporated

(57) ABSTRACT

Certain aspects of the present disclosure provide techniques for frequency tracking and timing tracking using wideband reference signals (RSs). A method that may be performed by a user equipment (UE) includes monitoring for a wideband RS from a network entity when one or more conditions are met, the wideband RS occupying a wider band of frequency resources than a tracking reference signal (TRS) transmitted by the network entity; and performing at least one of frequency tracking or timing tracking based on the monitoring.

29 Claims, 9 Drawing Sheets

(56) References Cited

OTHER PUBLICATIONS

Intel Corporation: "Remaining Details on TRS", 3GPP Draft, R1-1717376, 3GPP TSG RAN WG1 Meeting 90bis, Remaining Details on TRS, 3rd Generation Partnership Project (3GPP), Mobile Competence Centre; 650, Route Des Lucioles, F-06921 Sophia-Antipolis Cedex, France, vol. RAN WG1, no. Prague, CZ, Oct. 9, 2017-Oct. 13, 2017, Oct. 3, 2017, XP051352599, XP051340566, pp. 1-4, Fig. 3 and pp. 1 to 4, the whole document.
International Search Report and Written Opinion—PCT/US2022/023458—ISA/EPO—Jul. 6, 2022.
Mediatek Inc: "Remaining Issues on Trs", 3GPP Draft, R1-1801670, 3GPP TSG-RAN WG1 Meeting #92, Remaining Issues on TRS V1, 3rd Generation Partnership Project (3GPP), Mobile Competence Centre, 650, Route Des Lucioles, F-06921, Sophia-Antipolis Cedex, France, vol. RAN WG1, no. Athens, Greece, Feb. 26, 2018-Mar. 2, 2018, Feb. 17, 2018 (Feb. 7, 2018), XP051397671, 8 Pages, sec.2.1.

* cited by examiner

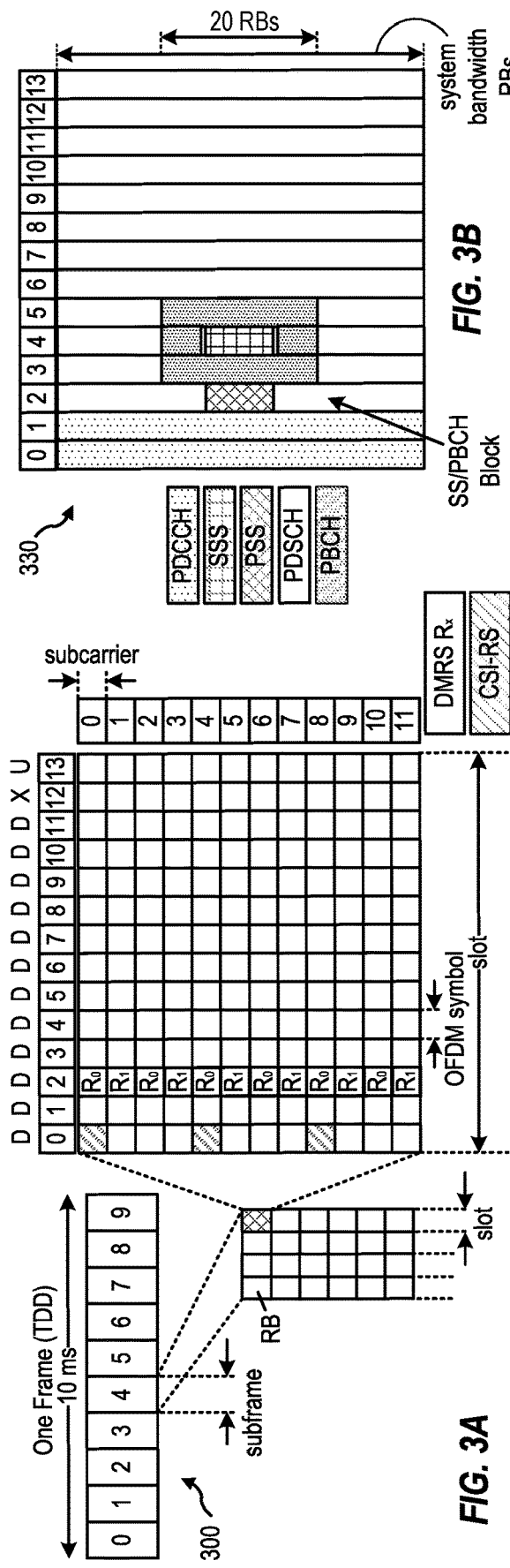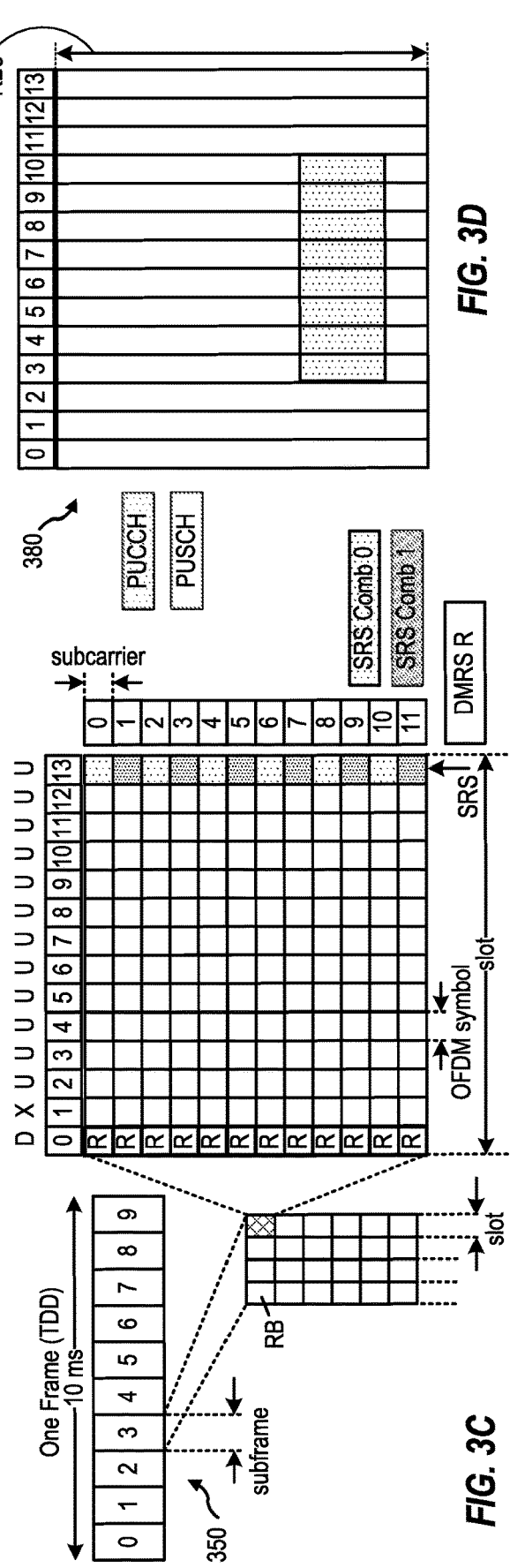

FREQUENCY TRACKING AND TIMING TRACKING USING WIDEBAND REFERENCE SIGNAL(S)

CROSS REFERENCE TO RELATED APPLICATIONS

This application claims benefits of and priority to U.S. Provisional Patent Application No. 63/171,517, filed on Apr. 6, 2021, which is assigned to the assignee hereof and herein incorporated by reference in the entirety as if fully set forth below and for all applicable purposes.

BACKGROUND

Aspects of the present disclosure relate to wireless communications, and more particularly, to techniques for frequency tracking and/or timing tracking using wideband reference signals (RSs).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division, orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a user equipment (UE). The method generally includes monitoring for a wideband reference signal (RS) from a network entity when one or more conditions are met, the wideband RS occupying a wider band of frequency resources than a tracking reference signal (TRS) transmitted by the network entity; and performing at least one of frequency tracking or timing tracking based on the monitoring.

Certain aspects can be implemented in a processing system for wireless communication by a UE. The processing system generally includes a memory comprising computer-executable instructions and one or more processors configured to execute the computer-executable instructions and cause the processing system to: monitor for a wideband RS from a network entity when one or more conditions are met, the wideband RS occupying a wider band of frequency resources than a TRS transmitted by the network entity; and perform at least one of frequency tracking or timing tracking based on the monitoring.

Certain aspects can be implemented in an apparatus for wireless communication by a UE. The apparatus may include means for monitoring for a wideband RS from a network entity when one or more conditions are met, the wideband RS occupying a wider band of frequency resources than a TRS transmitted by the network entity; and means for performing at least one of frequency tracking or timing tracking based on the monitoring.

Certain aspects can be implemented in a non-transitory computer-readable medium for wireless communication by a UE. The non-transitory computer-readable medium may comprise computer-executable instructions that, when executed by one or more processors of a processing system, cause the processing system to: monitor for a wideband RS from a network entity when one or more conditions are met, the wideband RS occupying a wider band of frequency resources than a TRS transmitted by the network entity; and perform at least one of frequency tracking or timing tracking based on the monitoring.

Certain aspects can be implemented in a computer program product for wireless communication by a UE embodied on a computer-readable storage medium. The computer-readable storage medium may comprise code for monitoring for a wideband RS from a network entity when one or more conditions are met, the wideband RS occupying a wider band of frequency resources than a TRS transmitted by the network entity; and performing at least one of frequency tracking or timing tracking based on the monitoring.

Certain aspects can be implemented in a method for wireless communication performed by a network entity. The method generally includes detecting when one or more conditions are met to trigger transmitting wideband reference signals (RS) that occupies a wider band of frequency resources than a tracking reference signal (TRS) transmitted by the network entity and transmitting the wideband RS to the UE based on the detection.

Certain aspects can be implemented in a processing system for wireless communication by a network entity. The processing system generally includes a memory comprising computer-executable instructions and one or more processors configured to execute the computer-executable instructions and cause the processing system to: detect when one or more conditions are met to trigger transmitting wideband reference signals (RS) that occupies a wider band of frequency resources than a tracking reference signal (TRS) transmitted by the network entity and transmit the wideband RS to the UE based on the detection.

Certain aspects can be implemented in an apparatus for wireless communication by a network entity. The apparatus may include means for detecting when one or more conditions are met to trigger transmitting wideband reference signals (RS) that occupies a wider band of frequency resources than a tracking reference signal (TRS) transmitted by the network entity and means for transmitting the wideband RS to the UE based on the detection.

Certain aspects can be implemented in a non-transitory computer-readable medium for wireless communication by a network entity. The non-transitory computer-readable medium may comprise computer-executable instructions that, when executed by one or more processors of a processing system, cause the processing system to: detect when one or more conditions are met to trigger transmitting wideband reference signals (RS) that occupies a wider band of frequency resources than a tracking reference signal (TRS) transmitted by the network entity and transmit the wideband RS to the UE based on the detection.

Certain aspects can be implemented in a computer program product for wireless communication by a user equipment network entity embodied on a computer-readable storage medium. The computer-readable storage medium may comprise code for detecting when one or more conditions are met to trigger transmitting wideband reference signals (RS) that occupies a wider band of frequency resources than a tracking reference signal (TRS) transmitted by the network entity and transmitting the wideband RS to the UE based on the detection.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for frequency tracking, timing tracking, or both frequency and time tracking by a user equipment (UE) using wideband reference signals (RSs).

The wideband RS may be used by the UE for such tracking before the UE is configured with the relatively narrowband tracking reference signals (TRSs) typically used for such purposes. The wideband RSs may be used in addition to, or as an alternative to conventional TRSs. As such, the techniques proposed herein may result in less frequent TRS transmissions and, therefore, reduced TRS overhead.

Introduction to Wireless Communication Networks

Figure 1:
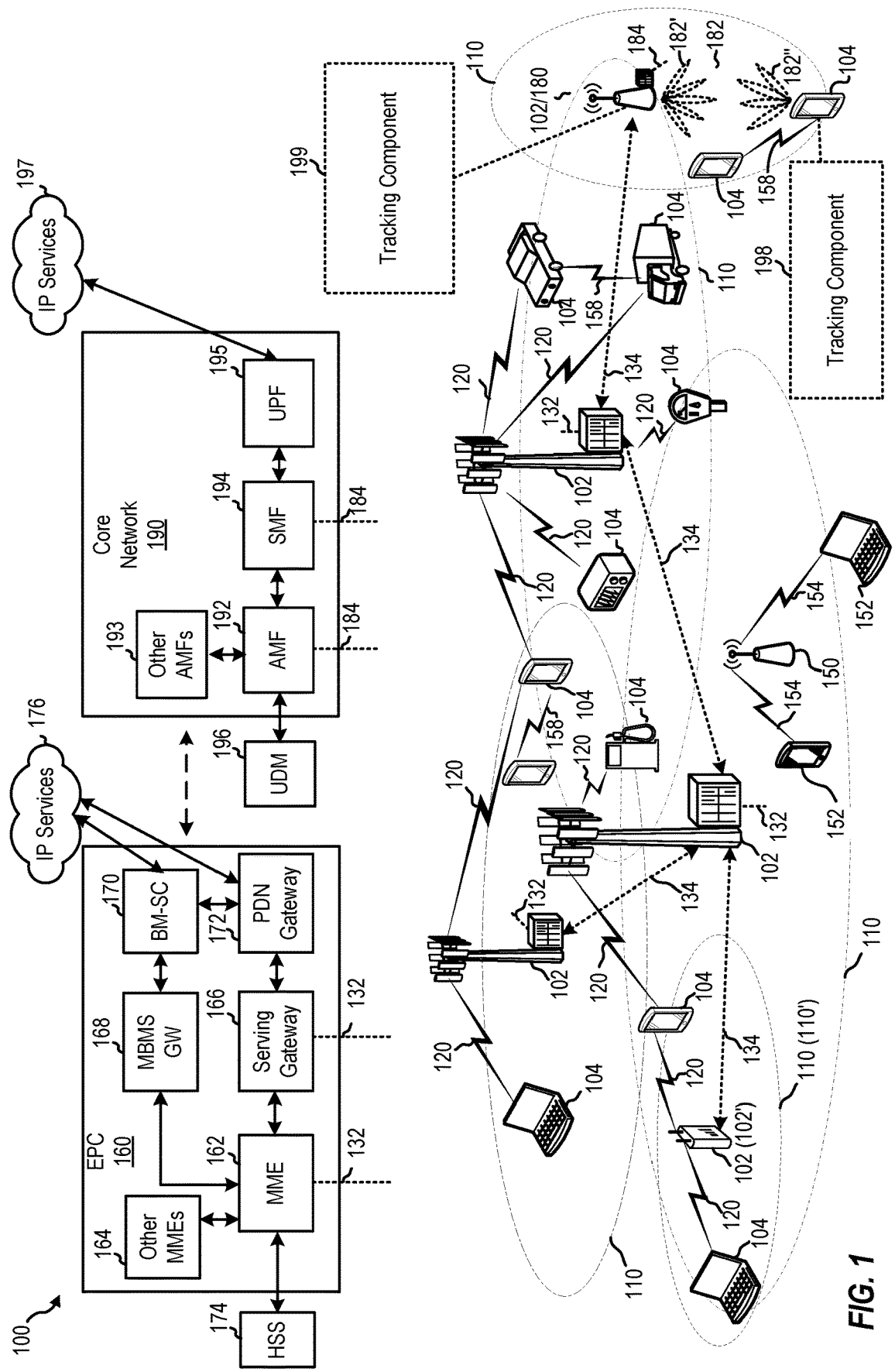
FIG. 1 is a block diagram conceptually illustrating an example wireless communication network.

FIG. 1 depicts an example of a wireless communications system 100, in which aspects described herein may be implemented. For example, the wireless communications system 100 may include a base station (BS) 102 with a tracking component 199 configured to perform one or more of the operations illustrated in FIG. 6, as well as other operations described herein for frequency tracking and timing tracking using wideband reference signals (RSs). The wireless communications system 100 may also include a user equipment (UE) 104 with a tracking component 198 configured to perform one or more of the operations illustrated in FIG. 5, as well as other operations described herein for frequency tracking and timing tracking using wideband RSs.

Generally, wireless communications system 100 includes BSs 102, user UEs 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 2:
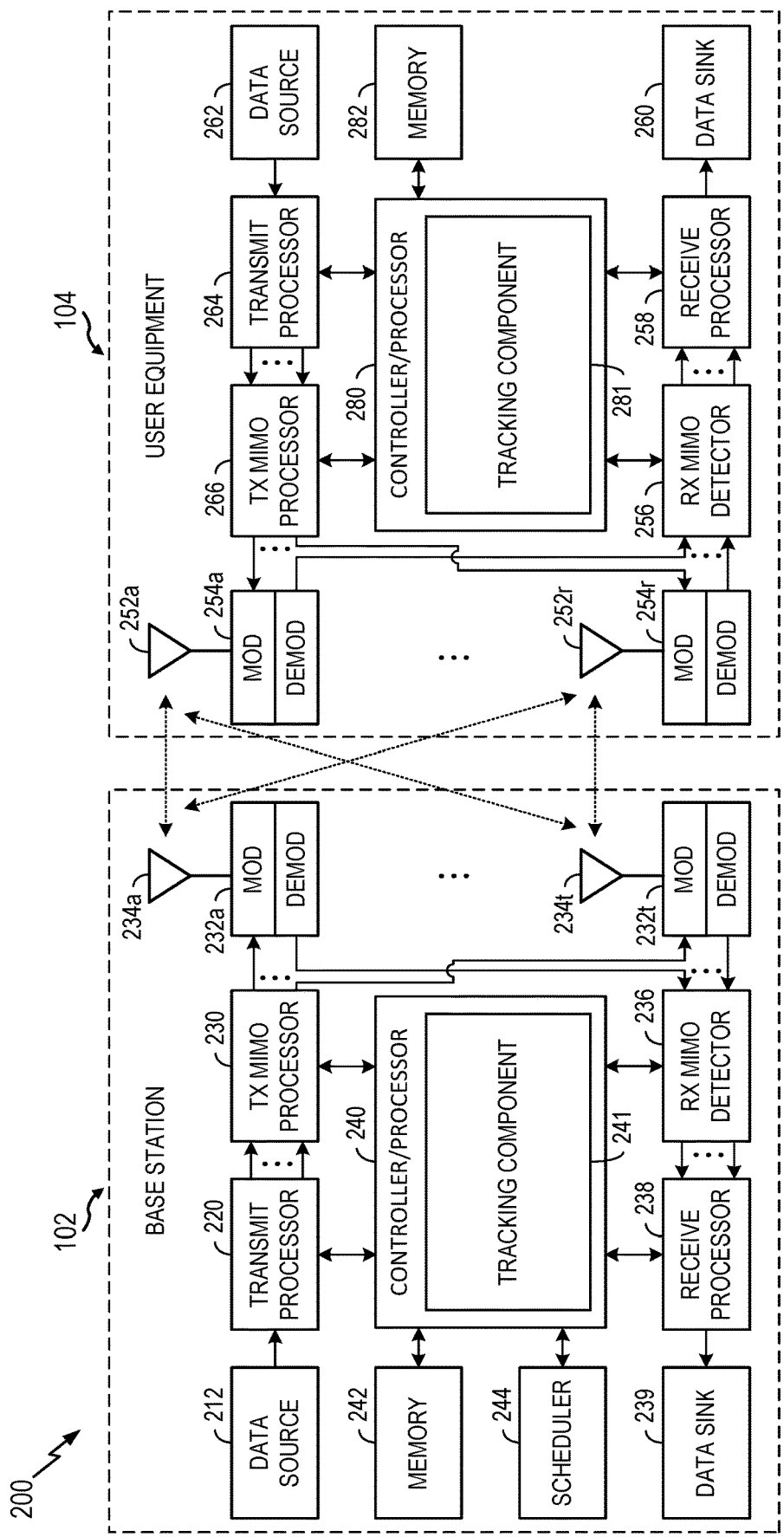
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (one or more processors such as processors e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes tracking component 241, which may be representative of tracking component 199 of FIG. 1. Notably, while depicted as an aspect of controller/processor 240, tracking component 241 may be implemented additionally or alternatively in various other aspects of base station 102 in other implementations.

Generally, user equipment 104 includes various processors (e.g., one or more processors such as processors 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 104 includes controller/processor 280, which may be configured to implement various functions related to wireless communications. In the depicted example, controller/processor 280 includes tracking component 281, which may be representative of tracking component 198 of FIG. 1. Notably, while depicted as an aspect of controller/processor 280, tracking component 281 may be implemented additionally or alternatively in various other aspects of user equipment 104 in other implementations.

Overview of Disaggregated Network Entity

In various aspects, a network entity or network node can be implemented as an aggregated base station, as a disaggregated base station, an integrated access and backhaul (IAB) node, a relay node, a sidelink node, to name a few examples.

A disaggregated base station architecture may include one or more central units (CUs) that can communicate directly with a core network via a backhaul link, or indirectly with the core network through one or more disaggregated base station units (such as a Near-Real Time (Near-RT) RAN Intelligent Controller (MC) via an E2 link, or a Non-Real Time (Non-RT) RIC associated with a Service Management and Orchestration (SMO) Framework, or both). A CU may communicate with one or more distributed units (DUs) via respective midhaul links, such as an F1 interface. The DUs may communicate with one or more radio units (RUs) via respective fronthaul links. The RUs may communicate with respective UEs via one or more radio frequency (RF) access links. In some implementations, the UE may be simultaneously served by multiple RUs.

Each of the units, i.e., the CUs, the DUs, the RUs, as well as the Near-RT RICs, the Non-RT RICs and the SMO Framework, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU. The CU may be configured to handle user plane functionality (i.e., Central Unit-User Plane (CU-UP)), control plane functionality (i.e., Central Unit-Control Plane (CU-CP)), or a combination thereof. In some implementations, the CU can be logically split into one or more CU-UP units and one or more CU-CP units. The CU-UP unit can communicate bidirectionally with the CU-CP unit via an interface, such as the E1 interface when implemented in an O-RAN configuration. The CU can be implemented to communicate with the DU, as necessary, for network control and signaling.

The DU may correspond to a logical unit that includes one or more base station functions to control the operation of one or more RUs. In some aspects, the DU may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU may further host one or more low PHY layers. Each layer (or module) can be implemented with an interface configured to communicate signals with other layers (and modules) hosted by the DU, or with the control functions hosted by the CU.

Lower-layer functionality can be implemented by one or more RUs. In some deployments, an RU, controlled by a DU, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) can be implemented to handle over the air (OTA) communication with one or more UEs. In some implementations, real-time and non-real-time aspects of control and user plane communication with the RU(s) can be controlled by the corresponding DU. In some scenarios, this configuration can enable the DU(s) and the CU to be implemented in a cloud-based RAN architecture, such as a vRAN architecture.

The SMO Framework may be configured to support RAN deployment and provisioning of non-virtualized and virtualized network elements. For non-virtualized network elements, the SMO Framework may be configured to support the deployment of dedicated physical resources for RAN coverage requirements which may be managed via an operations and maintenance interface (such as an O1 interface). For virtualized network elements, the SMO Framework may be configured to interact with a cloud computing platform (such as an open cloud (O-Cloud)) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework can communicate with a hardware aspect of a 4G RAN, such as an open eNB (O-eNB), via an O1 interface. Additionally, in some implementations, the SMO Framework can communicate directly with one or more RUs via an O1 interface. The SMO Framework also may include a Non-RT RIC configured to support functionality of the SMO Framework.

The Non-RT MC may be configured to include a logical function that enables non-real-time control and optimization of RAN elements and resources, Artificial Intelligence/Machine Learning (AI/ML) workflows including model training and updates, or policy-based guidance of applications/features in the Near-RT RIC. The Non-RT RIC may be coupled to or communicate with (such as via an A1 interface) the Near-RT RIC. The Near-RT RIC may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC.

In some implementations, to generate AI/ML models to be deployed in the Near-RT RIC, the Non-RT RIC may receive parameters or external enrichment information from external servers. Such information may be utilized by the Near-RT RIC and may be received at the SMO Framework or the Non-RT RIC from non-network data sources or from network functions. In some examples, the Non-RT RIC or the Near-RT RIC may be configured to tune RAN behavior or performance. For example, the Non-RT RIC may monitor long-term trends and patterns for performance and employ AI/ML models to perform corrective actions through the SMO Framework (such as reconfiguration via O1) or via creation of RAN management policies (such as A1 policies).

Overview of Example Data Structures

FIGS. 3A-3D depict aspects of data structures for a wireless communication network, such as wireless communication system 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Aspects Related to TRS

In fifth generation (5G) new radio (NR), timing error corrections are typically performed using a two-step process. In the first step, a synchronization signal block (SSB) is used for synchronization purposes to determine a coarse timing for the start of a slot (e.g., a fast Fourier transform (FFT) window). In the second step, a tracking reference signal (TRS) is used to refine the timing and track any drift in the timing error.

In general, SSB-based timing error correction is mainly used during initial access procedures, while TRS-based timing error correction is used for connected-mode operation. Thus, data reception prior to a radio resource control (RRC) connection (e.g., system information block (SIB) 1, Msg 2/4/B of a random access channel (RACH) procedure, etc.) may not benefit from the TRS-based fine timing error correction.

Before a TRS configuration is signaled (e.g., via RRC configuration), the timing resolution may not be enough when the data subcarrier spacing (SCS) is much larger than the SSB SCS, which can cause some performance degradation. This is because larger SCS corresponds to shorter symbol durations. Furthermore, in systems that aim to reduce TRS overhead, such as multi-transmit receive point (mTRP) scenario, some type of reference signal (RS) with a relatively large pull-in range may be needed to refine the timing estimates when the TRS are not transmitted (or when relatively few TRS are transmitted).

Accordingly, certain aspects of the present disclosure provide techniques for frequency tracking and timing tracking using wideband RSs. The techniques proposed herein may result in less frequent TRS transmissions and, therefore, reduced TRS overhead.

When connecting to and communicating with a wireless communication network, such as the wireless communication system 100, a user equipment (UE) may need to perform one or more synchronization procedures with the wireless communication to correct for timing errors, allowing the UE to properly receive transmissions from the wireless communication network. In particular, certain aspects provide techniques for frequency tracking and timing tracking using wideband reference signals (RSs).

Figure 4:
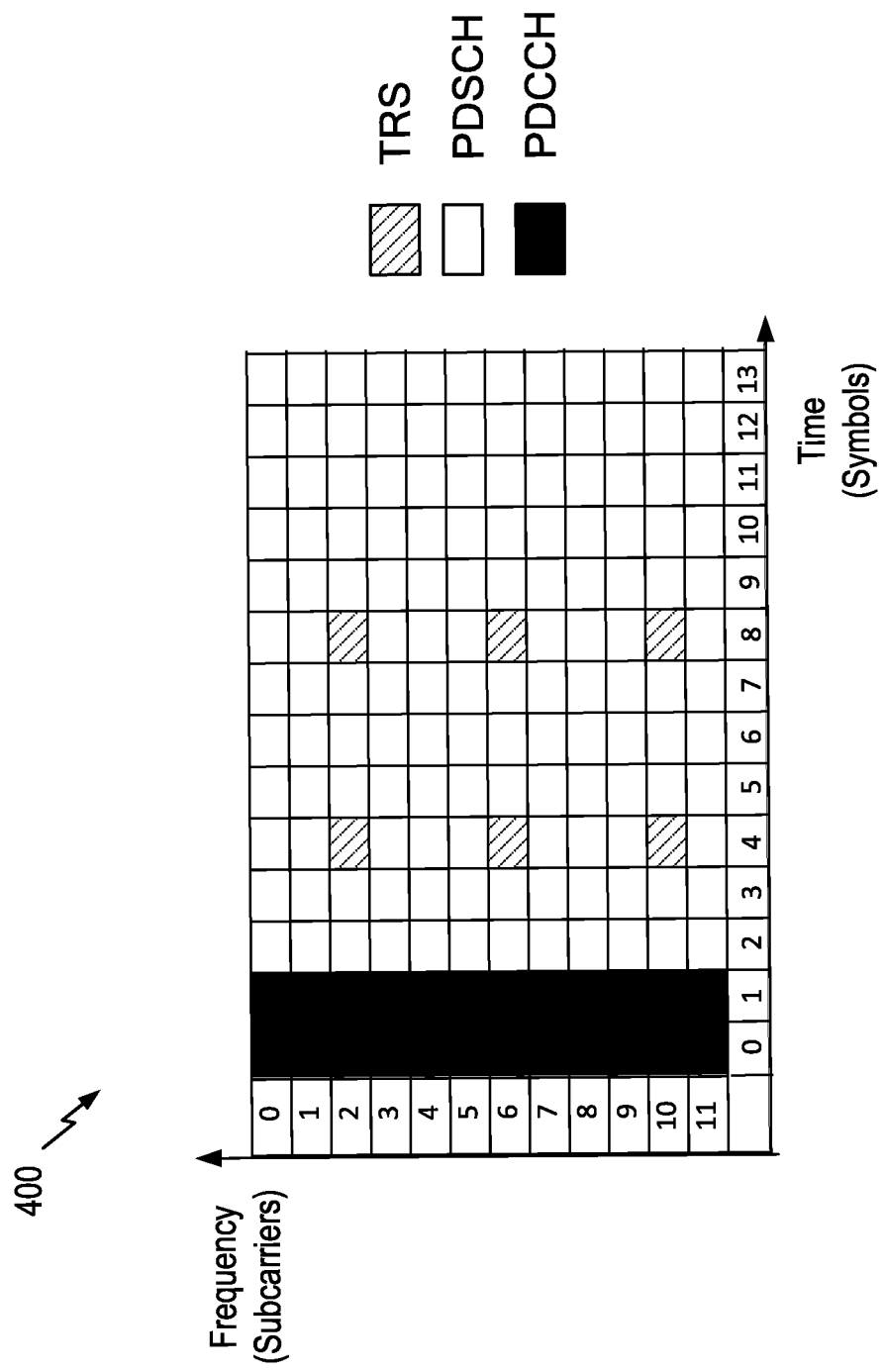
FIG. 4 shows a time-frequency resource grid, illustrating an example allocation of resources for TRS.

FIG. 4 shows a time-frequency resource grid 400, illustrating the allocation of resources for TRSs. As shown, time (in terms of symbols) is depicted along the horizontal axis while frequency (in terms of subcarriers) is depicted along the vertical axis. The time-frequency resource grid 400 illustrated in FIG. 4 may represent one resource block (RB), consisting of 12 subcarriers and one slot (e.g., including 12 to 14 symbols per slot) as described with respect to FIG. 3A. As shown, the time-frequency resource grid 400 includes resources for physical downlink control channel (PDCCH) transmissions, physical downlink shared channel (PDSCH) transmissions, and TRS in this example.

TRSs are a special type of channel state information reference signal (CSI-RS). For example, TRSs may include a resource set of multiple periodic CSI-RS. In typical configurations, TRSs may be transmitted in two adjacent slots and within two symbols within each slot. For example, as illustrated in FIG. 4, TRSs may be transmitted within symbols 4 and 8 of the time-frequency resource grid 400, having a symbol spacing of four ($\Delta n_{TRS}=4$). Further, as depicted, TRSs may have a subcarrier spacing (SCS) of four subcarriers measured from the centers of the TRS REs (e.g., $\Delta k_{TRS}=4$), resulting in a TRS density within a resource block (e.g., that only includes 12 subcarriers) of three resource elements. In other words, as depicted in FIG. 4, due to $\Delta k_{TRS}=4$, three TRS may be transmitted within a resource block.

Additionally, TRSs may have a symbol spacing within a slot ($\Delta n_{TRS}$) of four symbols (e.g., $\Delta n_{TRS}=4$ symbols). In some cases, the symbol positions for the TRSs may be configured by radio resource control (RRC) signaling and may be one of several options. For example, as shown in FIG. 4, TRS may be located in symbols 4 and 8. In other cases, TRS may be located in symbols 5 and 9. In yet other cases, TRS may be located in symbols 6 and 10.

Generally, timing errors may only be corrected by TRS if the timing error is within a pull-in range of the TRS symbols. The timing pull-in range may be based on an SCS of the PDSCH and specifies the maximum amount of timing error (e.g., typically in microseconds) that may be corrected. In other words, any timing error greater than the timing pull-in range of the TRS may not be able to be corrected by using TRS. As an example, the TRS timing pull-in range may be determined according to Equation 1, below.

$$\text{Timing pull-in range} = +/- \frac{1}{2 \times \Delta k_{TRS} * SCS_{PDSCH}} \quad (1)$$

As shown in Equation 1, $\Delta k_{TRS}$ is the subcarrier spacing of the TRS and $SCS_{PDSCH}$ is the subcarrier spacing of the PDSCH. In legacy systems that use a subcarrier spacing of $\Delta k_{TRS}=4$, Equation 1 may be simplified, as follows, in Equation 2.

$$\text{Timing pull-in range} = +/- \frac{1}{8 * SCS_{PDSCH}} \quad (2)$$

In some cases, whether a timing error is within the timing pull-in range of the TRS, and thus correctable by the TRS, may depend on the magnitude of the timing error after SSB timing correction has been performed. In other words, whether the timing error is within the pull-in range of the TRS may depend on an SSB configuration. For example, in current SSB configurations, the synchronization signals of an SSB may consist of 127 subcarriers ($k_{SSB}=127$) and have a granularity or resolution determined according to Equation 3, below.

$$g_{SSB} = \frac{1}{BW_{SSB}} = \frac{1}{k_{SSB} \times SCS_{SSB}} \quad (3)$$

As depicted, $BW_{SSB}$ is a bandwidth associated with the SSBs and may be based on the number of subcarriers (e.g., $k_{SSB}$) and a subcarrier spacing of the SSBs ($SCS_{SSB}$). In some cases, the granularity of SSBs may be enhanced using 2× oversampling, which is represented, below, in Equation 4.

$$g_{SSB} = \frac{1}{2k_{SSB} \times SCS_{SSB}} \quad (4)$$

Accordingly, as an example, assuming the number of subcarriers associated with the SSBs is 127 subcarriers and a subcarrier spacing of 120 kHz, the SSB granularity may be approximately 32.81 nanoseconds (ns), as shown below in Equation 5.

$$g_{SSB} = \frac{1}{2(127) \times 120} = 32.81 \text{ ns} \quad (5)$$

In the example shown in Equation 5, the SSB granularity of 32.81 ns may represent the minimum amount of timing error that may be corrected. Accordingly, as can be seen, as the SSB subcarrier spacing increases, the SSB granularity, or minimum amount of timing error that can be corrected, decreases. Typically, it is better to have lower SSB granularities as this would allow the SSBs to correct for more-minute timing errors.

In some cases, the amount of timing error that can be corrected using the SSB may be determined in different manners. A first manner may be based on a number of samples, n. For example, in such cases, assuming that SSBs may reduce the timing error down to six samples (n=6 samples), the timing error after SSB correction may be within the range of $n \times g_{SSB}=196.86$ ns.

Another manner for determining the amount of timing error that SSBs are able to correct may be based on a cyclic prefix associated with the SSBs ($CP_{SSB}$). For example, the SSBs may typically reduce the timing error to within $$\pm \frac{CP_{SSB}}{2}.$$

In such cases, assuming a subcarrier spacing of 120 kHz ($SCS_{SSB}$=120 kHz) and a cyclic prefix of 585.94 ns ($CP_{SSB}$=585.94 ns), the timing error after SSB correction may be around 292.97 ns. For example, a symbol time of each of the SSB symbols (without CP) may be equal to $$\frac{1}{SCS_{SSB}}.$$

Typically, the CP occupies 0.0703125 of the symbol time. Hence, for $SCS_{SSB}$=120 kHz, $$CP \text{ duration} = 0.0703125 \times \frac{1}{120000} = 585.94 \text{ ns}.$$

In some cases, an additional safety margin may be required to account for timing errors due to noise. For example, as noise increases, the timing error correction algorithm based on SSBs may not be able to reduce the timing errors to 6 samples or $$\pm \frac{CP_{SSB}}{2}.$$

The timing error correction algorithm may be able to reduce the timing errors to 7 or 8 samples or a little bit more than $$\pm \frac{CP_{SSB}}{2}.$$

Thus, an additional safety margin may be needed to ensure the time pull-in range of the TRS can correct a little bit more than $$\pm \frac{CP_{SSB}}{2}.$$

or 6 samples. However, questions still remain regarding enhancement of TRS for RRC idle/inactive-mode operation.

Aspects Related to Frequency Tracking and Timing Tracking Using Wideband RSs

As noted above, before a TRS configuration is signaled (e.g., via RRC configuration), the timing resolution may not be enough when the data subcarrier spacing (SCS) is much larger than the SSB SCS, which can cause some performance degradation. Furthermore, in some cases, it may be beneficial to reduce the TRS overhead by sending fewer TRS signals especially for multi-transmit receive point (mTRP) operation. If fewer TRS are sent, an alternative reference signal (RS) with a relatively large pull-in range may be used to refine the timing estimates when the TRS signals are not transmitted (or relatively few are transmitted).

Aspects of the present disclosure provide apparatuses, methods, processing systems, and computer-readable mediums for frequency tracking, timing tracking, or both frequency and time tracking by a user equipment (UE) using wideband reference signals (RSs). As example of such a wideband RS is wideband DMRS sent using a wideband precoder.

The techniques presented herein may help reduce TRS overhead by utilizing wideband DMRS. As will be described in greater detail below, the wideband DMRS can be scheduled opportunistically, for example, when one or more conditions are met (e.g., when a UE has not yet been configured with TRS or is configured with only sparse TRS).

Figure 5:
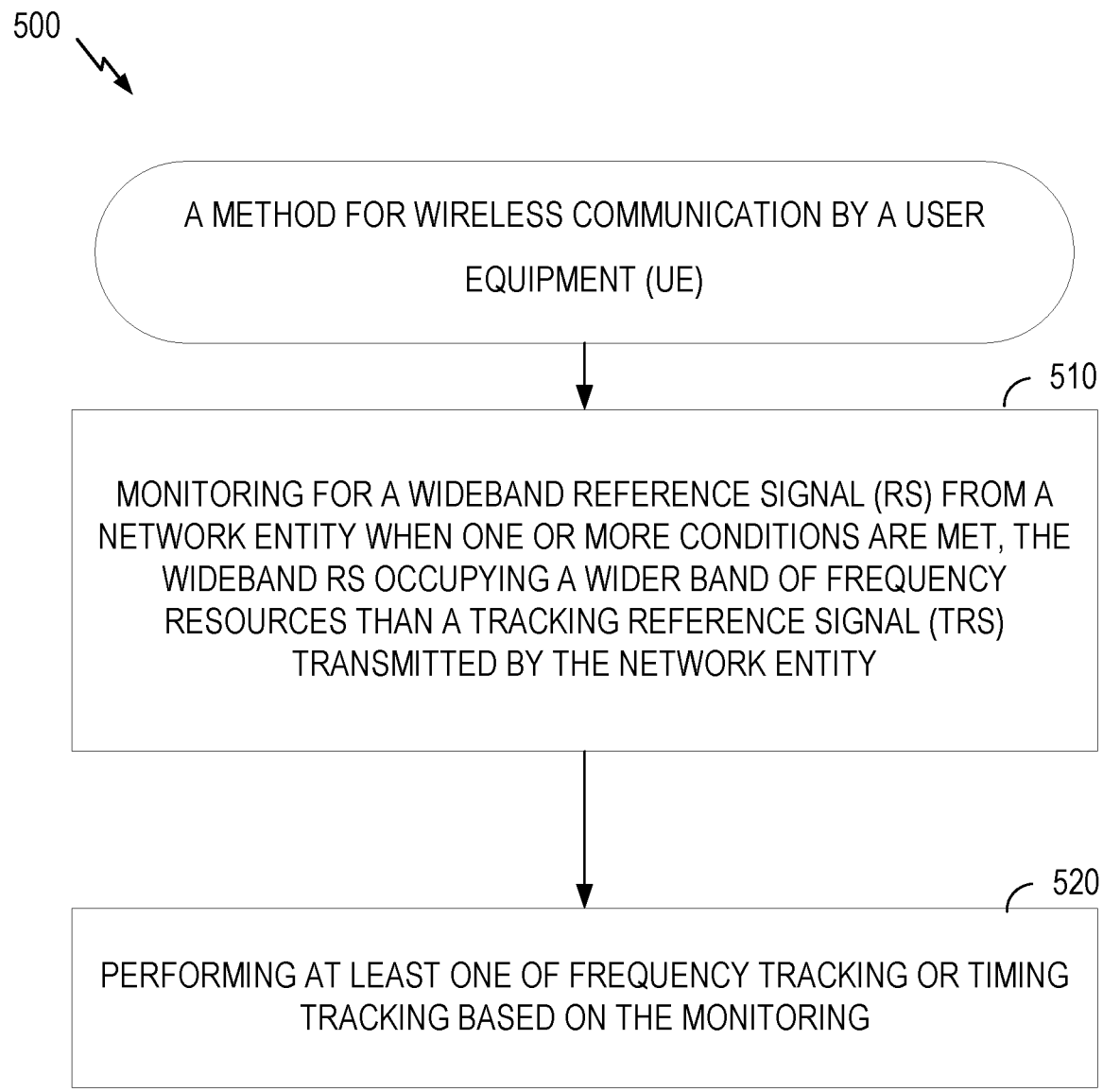
FIG. 5 is a flow diagram illustrating example operations for wireless communication by a base station.

FIG. 5 is a flow diagram illustrating example operations 500 for wireless communication, in accordance with certain aspects of the present disclosure. The operations 500 may be performed, for example, by a UE (e.g., the UE 104 in the wireless communication system 100 of FIG. 1) for frequency tracking and timing tracking using wideband RSs. The operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the tracking component 281) obtaining and/or outputting signals.

The operations 500 begin, in block 510, by monitoring for a wideband reference signal (RS) from a network entity when one or more conditions are met, the wideband RS occupying a wider band of frequency resources than a tracking reference signal (TRS) transmitted by the network entity.

At 520, the UE performs at least one of frequency tracking or timing tracking based on the monitoring.

Figure 6:
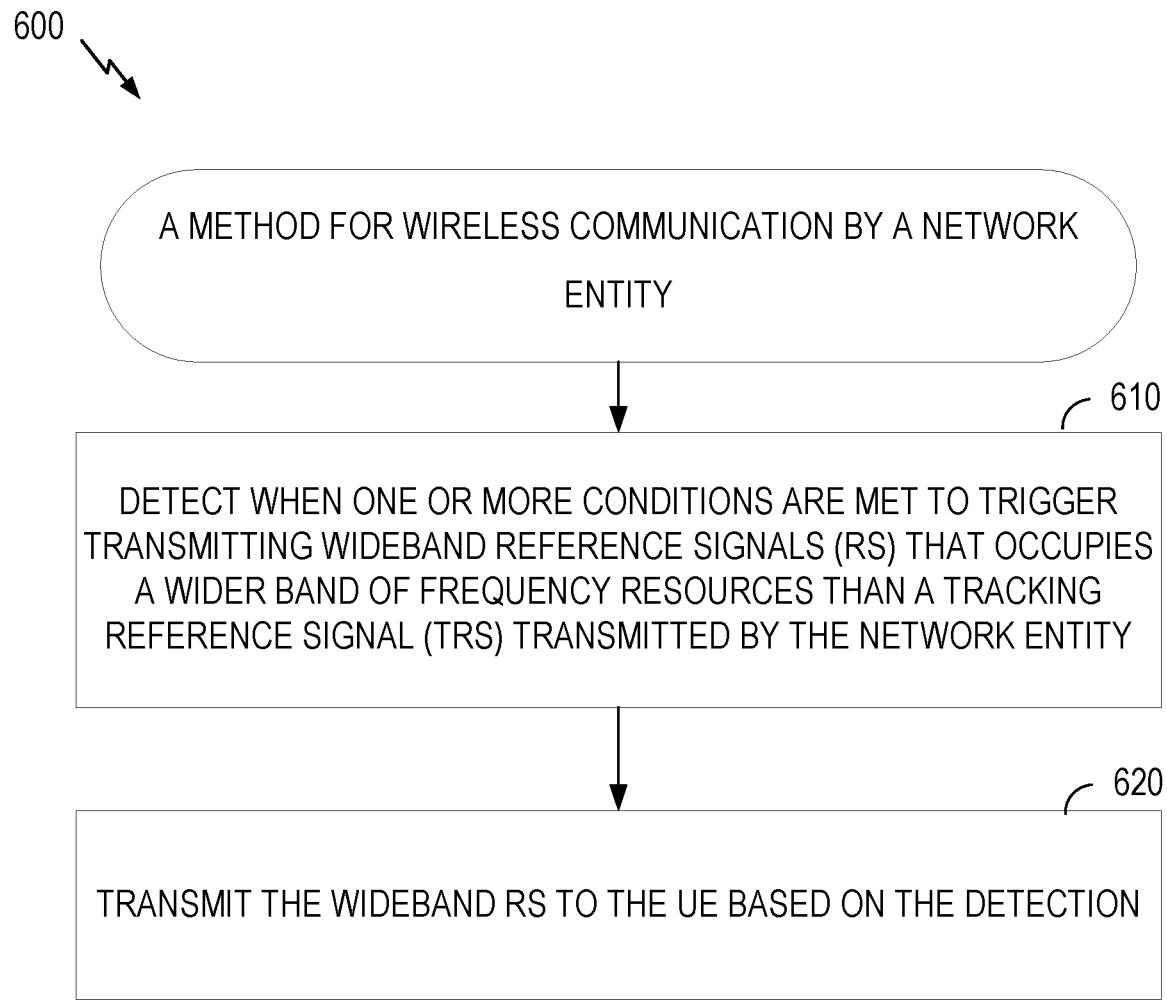
FIG. 6 is a flow diagram illustrating example operations for wireless communication by a user equipment.

FIG. 6 is a flow diagram illustrating example operations 600 for wireless communication that may be considered complementary to operations 500 of FIG. 5. For example, the operations 600 may be performed by a BS (e.g., the BS 102 in the wireless communication system 100 of FIG. 1) to transmit wideband RS to a UE performing operations 500 of FIG. 5. The operations 600 may be implemented as software components that are executed and run on one or more processors (e.g., controller/processor 240 of FIG. 2). The operations 600 may be complementary to the operations 500 performed by the UE. Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240, including the tracking component 241) obtaining and/or outputting signals.

The operations 600 begin at 610 by detecting when one or more conditions are met to trigger transmitting (e.g., to a UE) wideband reference signals (RS) that occupies a wider band of frequency resources than a tracking reference signal (TRS) transmitted by the network entity. At 620, the network entity transmits the wideband RS to the UE based on the detection.

Figure 7:
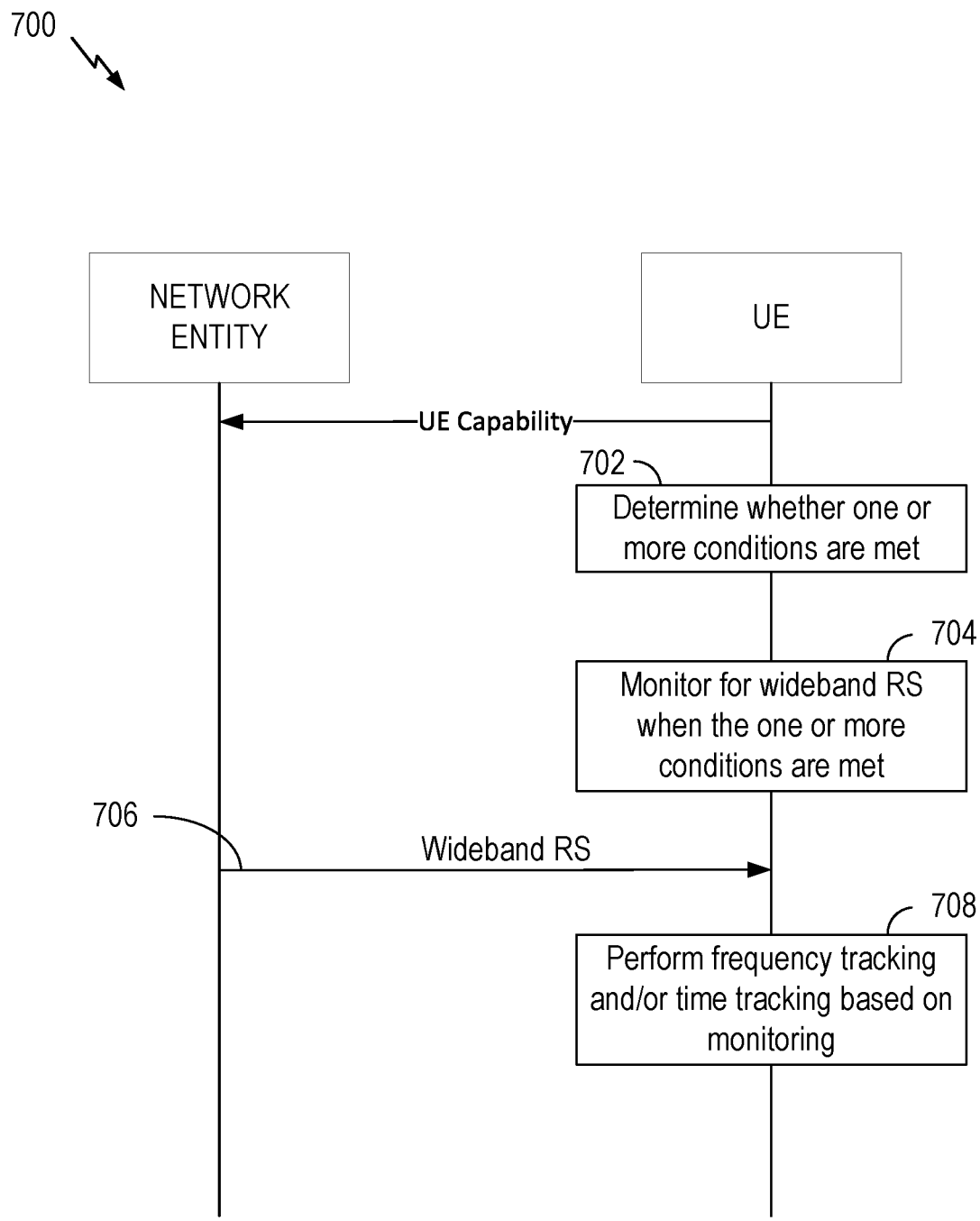
FIG. 7 is a call flow diagram illustrating example operations between a network entity and a user equipment for frequency tracking and timing tracking using wideband reference signals (RSs).

Operations 500 and 600 of FIGS. 5 and 6 may be understood with reference to the call flow diagram 700 of FIG. 7, showing signaling between a network entity and a UE performing time and/or frequency tracking based on wideband RS.

As shown, at 702, the UE determining whether one or more conditions are met for the network entity to transmit wideband RS. When the conditions are met, the UE monitors for wideband RS, at 704. Based on the wideband RS 706, the UE performs frequency tracking and/or time tracking.

In some cases, one of the conditions may be that the UE 104 has not yet received radio resource control (RRC) configuration of tracking reference signals (TRS). In this case, wideband RS, such as wideband DMRS may help the UE perform initial access, for example, with the ability to refine relatively coarse SSB-based timing using wideband DMRS.

In some cases, one of the conditions may be that a synchronization signal block (SSB) subcarrier spacing (SCS) is less than a physical downlink shared channel (PDSCH) SCS. This may be implemented as a rule, such that a wideband precoder for DMRS is used whenever:

$SCS_{SSB} < SCS_{DATA} \times m$ (i.e., Data SCS multiplied by integer $m$), where m is an integer, m>=2. On the other hand, when the ratio between the SSB and Data SCSs is relatively small (e.g., and this rule is not satisfied), the SSB time estimate may be assumed to be good enough.

In some cases, the network may indicate the use of wideband DMRS for an upcoming transmission via a system information (SI). For example, the network may indicate the use of wideband DMRS via remaining minimum system information (RMSI).

In some cases, the BS may transmit the UE an RRC configuration indicating the wideband precoder and then indicate use of the wideband precoder via a downlink control information (DCI) message scheduling a subsequent transmission. The BS may then transmit the subsequent transmission with the wideband DMRS using the wideband precoder.

In some cases, the UE may provide an indication that it supports timing offset compensation (TOC) using wideband DMRS. For example, the indication may be provided as part of UE capability reporting, as shown in FIG. 7. The BS 102 may configure fewer TRS transmissions for UEs that indicate such capability and, instead, these UEs may be scheduled with wideband DMRS. In other words, the BS 102 may configure a UE that supports TOC using wideband DMRS with TRS transmissions that are sparser in time (e.g., zero or fewer TRS transmissions) than UEs that do not support TOC using wideband DMRS. As such, the BS 102 can configure a first set of one or more UEs that indicate support of TOC using wideband DMRS with fewer TRS transmissions than configured for a second set of one or more UEs.

In some cases, after RRC configuration indicating TRS configuration, the BS (e.g., gNB) may still configure wideband DMRS for time refinement to reduce TRS overhead. This mix between wideband DMRS and TRS will help in reducing the TRS overhead and UE complexity.

In some cases, DMRS bundling may be used with wideband DMRS, which may increase the accuracy of UE tracking based on wideband DMRS. DMRS bundling generally refers to sending the same or coherent DMRS in multiple time slots for coverage enhancement. This may allow the UE to perform joint channel estimation on the DMRS in multiple time slots to improve the accuracy.

In some cases, wideband DMRS may be used in scenarios with multiple transmitter receiver points (TRPs). Each TRP may be associated with a different transmission configuration indicator (TCI) state (e.g., indicating QCL/transmission parameters for that TRP).

In some cases, a scheduling DCI can indicate multiple TCI states, while indicating one bundling size. In some cases, however, different bundle sizes may be supported by each TCI state, to allow timing refinement based on wideband DMRS and be able to reduce TRS overhead.

The different bundling sizes may be indicated in different manners. In some cases, the bundle size in the DCI can be applied to one TCI state (e.g., a first TCI), and another bundle size, for example, defined by RRC or media access control (MAC) control element (CE) signaling, may be applied to the other TCI state.

In some cases, the signaled bundle size may be applied to the first TCI state, and the bundle size of the other TCI can be determined based on TRS transmission. For example, a time duration threshold can be configured, and if a time duration between the last TRS and data transmission is greater than the time duration threshold, then a wideband DMRS can be assumed. Otherwise, the signaled bundle size can be applied for both TCI states.

As another example, the network entity may configure one TCI state with TRS of a larger duty cycle/period (less frequent TRS transmissions) than the other TCI state. Whenever this duty cycle is greater than a configured threshold, the DMRS of this TCI may be assumed to be wideband precoded. In some cases, a bundle size field in a DCI may be increased such that gNB can signal a different bundle size for each individual TCI state.

In certain aspects, different TCI states may have different prb-BundlingType configurations. For example, one TCI state can be configured with "dynamicBundling" while the other TCI state can be configured with "staticBundling." In some cases, the TCI state with more frequent TRS can be configured with "staticBundling" while the TCI state with less frequent TRS can be configured with "dynamicBundling." In certain aspects, the physical resource block (PRB) bundle size field in DCI can apply to the TCI state with "dynamicBundling" configuration.

In certain aspects, the bundle size field may be maintained (e.g., as defined in current NR wireless standards), but the field can point to a vector of the bundle size corresponding to multiple TCI states. For example, in current systems, when the PRB bundling size indicator ($P_{BWP,i}$) signaled in DCI (e.g., DCI format 1_1) is set to 0, the UE uses the $P_{BWP,i}'$ value from the second set of $P_{BWP,i}'$ values. However, the $P_{BWP,i}'$ value of the second set can be configured differently for different TCI states. For example, the second set of one TCI state can be configured with "4" PRB while the other TCI state can be configured with "wideband" PRB. This way, when the PRB bundling size indicator is set to 0, it can signal different bundling sizes for different TCI states. This may also apply to the first set configuration of $P_{BWP,i}'$.

In certain aspects, to allow joint processing of DMRS and TRS, beams used for DMRS and TRS transmissions may be quasi co-located (QCL'ed). In this regard, this joint processing of the DMRS and TRS can be used to refine the frequency offset estimation. In some cases, the network entity can indicate, to the UE, whether the same precoder is used for TRS and DMRS signals. This indication can be via RRC signaling, MAC-CE, or DCI. In some cases, if indicated, the UE may assume the same precoder is applied to the DMRS and TRS if the DMRS and the TRS are transmitted within a specified time window.

Example Wireless Communication Devices

Figure 8:
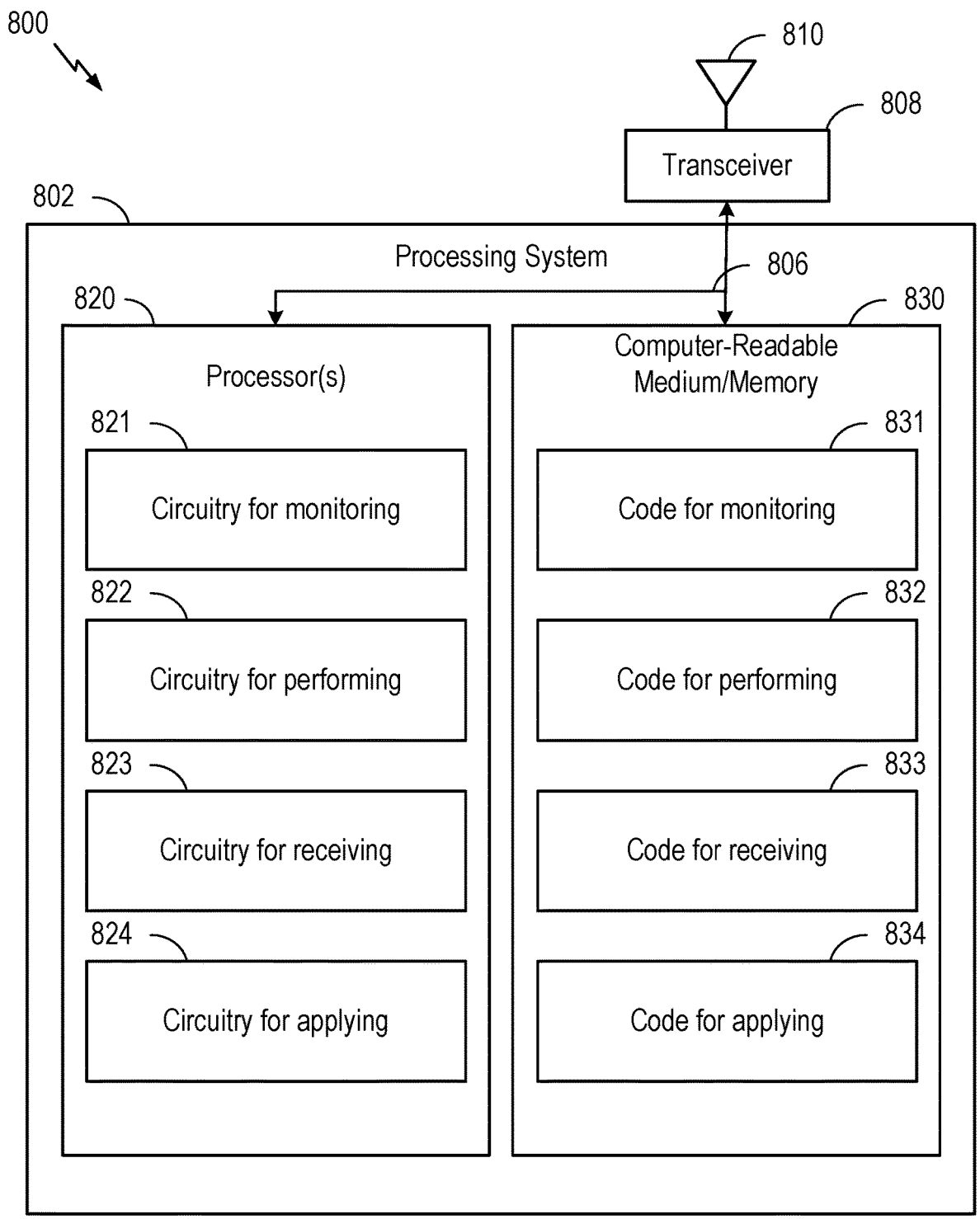
FIGS. 8 and 9 depict aspects of an example communications devices.

FIG. 8 depicts an example communications device 800 that includes various components operable, configured, or adapted to perform operations for the techniques disclosed herein, such as the operations depicted and described with respect to FIG. 5. In some examples, communication device 800 may be a user equipment 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 5, or other operations for performing the various techniques discussed herein for frequency tracking and timing tracking using wideband RSs.

In the depicted example, computer-readable medium/memory 830 stores code 831 for monitoring and code 832 for performing.

In the depicted example, the one or more processors 820 include circuitry configured to implement the code stored in the computer-readable medium/memory 830, including circuitry 821 for monitoring and circuitry 822 for performing.

Various components of communications device 800 may provide means for performing the methods described herein, including with respect to FIG. 5.

In some examples, means for transmitting or sending (or means for outputting for transmission) may include the transceivers 254 and/or antenna(s) 252 of the user equipment 104 illustrated in FIG. 2 and/or transceiver 808 and antenna 810 of the communication device 800 in FIG. 8.

In some examples, means for receiving (or means for obtaining) may include the transceivers 254 and/or antenna(s) 252 of the user equipment 104 illustrated in FIG. 2 and/or transceiver 808 and antenna 810 of the communication device 800 in FIG. 8.

In some examples, means for determining, means for monitoring, and means for performing may include various processing system components, such as: the one or more processors 820 in FIG. 8, or aspects of the user equipment 104 depicted in FIG. 2, including receive processor 258, transmit processor 264, TX MIMO processor 266, and/or controller/processor 280 (including tracking component 281).

Notably, FIG. 8 is just use example, and many other examples and configurations of communication device 800 are possible.

Figure 9:
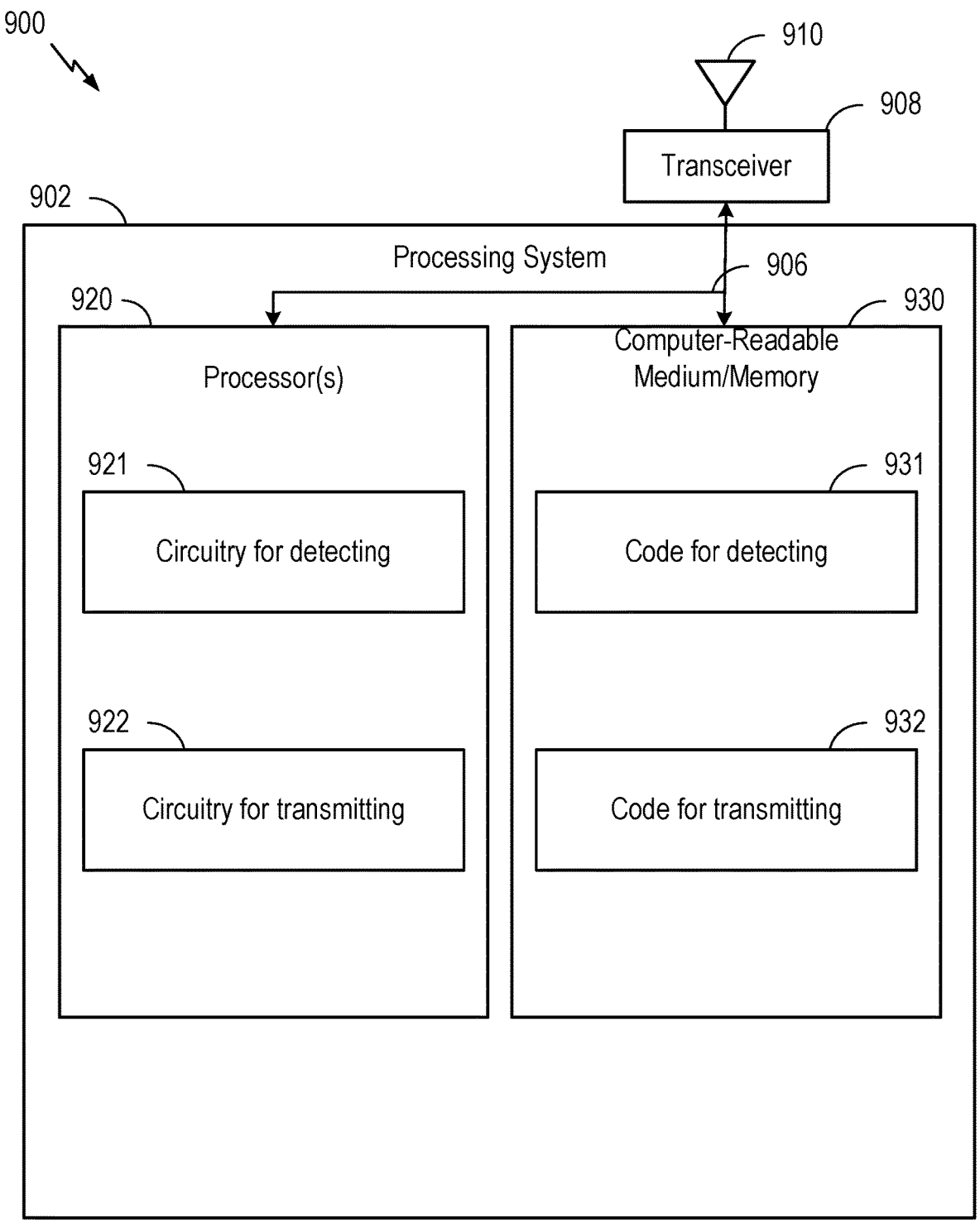

FIG. 9 depicts an example communications device 900 that includes various components operable, configured, or adapted to perform operations for the techniques disclosed herein, such as the operations depicted and described with respect to FIG. 6. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 6, or other operations for performing the various techniques discussed herein for frequency tracking and timing tracking using wideband RSs.

In the depicted example, computer-readable medium/memory 930 stores code 931 for detecting, and code 932 for transmitting.

In the depicted example, the one or more processors 920 include circuitry configured to implement the code stored in the computer-readable medium/memory 930, including circuitry 921 for detecting, and circuitry 922 for transmitting.

Various components of communications device 900 may provide means for performing the methods described herein, including with respect to FIG. 6.

In some examples, means for transmitting or sending (or means for outputting for transmission) may include the transceivers 232 and/or antenna(s) 234 of the base station 102 illustrated in FIG. 2 and/or transceiver 908 and antenna 910 of the communication device 900 in FIG. 9.

In some examples, means for receiving (or means for obtaining) may include the transceivers 232 and/or antenna(s) 234 of the base station illustrated in FIG. 2 and/or transceiver 908 and antenna 910 of the communication device 900 in FIG. 9.

In some examples, means for determining, means for providing, and means for limiting may include various processing system components, such as: the one or more processors 920 in FIG. 9, or aspects of the base station 102 depicted in FIG. 2, including receive processor 238, transmit processor 220, TX MIMO processor 230, and/or controller/processor 240 (including tracking component 241).

Notably, FIG. 9 is just use example, and many other examples and configurations of communication device 900 are possible.

Example Aspects

Implementation examples are described in the following numbered aspects:

Aspect 1: A method for wireless communications by a user equipment (UE), comprising: monitoring for a wideband reference signal (RS) from a network entity when one or more conditions are met, the wideband RS occupying a wider band of frequency resources than a tracking reference signal (TRS) transmitted by the network entity; and performing at least one of frequency tracking or timing tracking based on the monitoring.

Aspect 2: The method of Aspect 1, wherein the wideband RS comprises wideband demodulation reference signal (DMRS) transmitted from the network entity using a wideband precoder.

Aspect 3: The method of Aspect 2, wherein the one or more conditions comprise that the UE has not yet received radio resource control (RRC) configuration of the TRS.

Aspect 4: The method of Aspect 3, wherein the one or more conditions further comprise that a synchronization signal block (SSB) subcarrier spacing (SCS) is less than a physical downlink shared channel (PDSCH) SCS.

Aspect 5: The method of any one of Aspects 3-4, wherein the one or more conditions further comprise that the UE receives system information (SI) indicating the UE is to use wideband DMRS to perform at least one of frequency tracking or timing tracking for an upcoming transmission.

Aspect 6: The method of any one of Aspects 3-5, further comprising: receiving an RRC configuration indicating the wideband precoder; receiving a downlink control information (DCI) message scheduling a subsequent transmission; and receiving the subsequent transmission, wherein the subsequent transmission is transmitted by the network with the wideband DMRS using the wideband precoder.

Aspect 7: The method of any one of Aspects 2-6, wherein at least one of the conditions is that the UE has provided an indication that it supports timing offset compensation (TOC) using wideband DMRS.

Aspect 8: The method of Aspect 7, further comprising receiving signaling for the UE to perform time refinement based on wideband DMRS, as an alternative or in addition to TRS, after radio resource control (RRC) configuration.

Aspect 9: The method of any one of Aspects 2-8, further comprising: receiving a downlink control information (DCI) indicating at least two transmission configuration indicator (TCI) states; and applying different bundle sizes for transmissions using the at least two TCI states.

Aspect 10: The method of Aspect 9, wherein applying different bundle sizes for transmissions using the at least two TCI states comprises: applying a first bundle size indicated in the DCI for transmissions using a first TCI state; and applying a second bundle size, indicated via at least one of radio resource control (RRC) or medium access control (MAC) control element (CE) signaling for transmissions using a second TCI state.

Aspect 11: The method of any one of Aspects 9-10, wherein applying different bundle sizes for transmissions using the at least two TCI states comprises: applying a first bundle size indicated in the DCI for transmissions using a first TCI state; and applying a second bundle size, derived from a TRS transmission, for transmissions using a second TCI state.

Aspect 12: The method of any one of Aspects 9-11, wherein applying different bundle sizes for transmissions using the at least two TCI states comprises: applying a first bundle size indicated in the DCI for transmissions using a first TCI state; and applying a second bundle size also indicated in the DCI for transmissions using a second TCI state.

Aspect 13: The method of any one of Aspects 9-12, wherein the different bundle sizes are configured for the at least two TCI states.

Aspect 14: The method of any one of Aspects 9-13, wherein the different bundle sizes are determined based on a field in the DCI that maps to a vector of bundling sizes for the at least two TCI states.

Aspect 15: The method of any one of Aspects 2-14, further comprising: monitoring for TRS with one or more beams that are quasi co-located (QCL'ed) with one or more beams used for monitoring the wideband DMRS; and jointly processing the DMRS and TRS to perform at least one of frequency tracking or timing tracking.

Aspect 16: The method of Aspect 15, wherein the joint processing is performed to refine a frequency offset estimation.

Aspect 17: The method of any one of Aspects 2-16, further comprising receiving an indication of whether or not a same precoder was used for the DMRS and TRS.

Aspect 18: The method of Aspect 17, wherein the indication is received via at least one of radio resource control (RRC), medium access control (MAC) control element (CE), or downlink control information (DCI) signaling.

Aspect 19: A user equipment (UE) comprising: a memory; a transceiver; and at least one processor, coupled to the memory and the transceiver, configured to perform a method of any one of Aspects 1-18.

Aspect 20: A method for wireless communications by a network entity, comprising: detecting when one or more conditions are met to trigger transmitting, to a user equipment (UE), wideband reference signals (RS) that occupy a wider band of frequency resources than a tracking reference signal (TRS) transmitted by the network entity; and transmitting the wideband RS to the UE based on the detection.

Aspect 21: The method of Aspect 20, wherein the wideband RS comprises wideband demodulation reference signal (DMRS) transmitted from the network entity using a wideband precoder.

Aspect 22: The method of Aspect 21, wherein the one or more conditions comprise that the UE has not yet received radio resource control (RRC) configuration of the TRS.

Aspect 23: The method of Aspect 22, wherein the one or more conditions further comprise that a synchronization signal block (SSB) subcarrier spacing (SCS) is less than a physical downlink shared channel (PDSCH) SCS.

Aspect 24: The method of any one of Aspects 22-23, wherein the one or more conditions further comprise that the UE receives system information (SI) indicating the UE is to use wideband DMRS to perform at least one of frequency tracking or timing tracking for an upcoming transmission.

Aspect 25: The method of any one of Aspects 22-24, further comprising: transmitting the UE an RRC configuration indicating the wideband precoder; transmitting a downlink control information (DCI) message scheduling a subsequent transmission; and transmitting the subsequent transmission with the wideband DMRS using the wideband precoder.

Aspect 26: The method of any one of Aspects 21-25, wherein at least one of the conditions is that the UE has provided an indication that it supports timing offset compensation (TOC) using wideband DMRS.

Aspect 27: The method of Aspect 26, further comprising transmitting signaling for the UE to perform time refinement based on wideband DMRS, as an alternative or in addition to TRS, after radio resource control (RRC) configuration.

Aspect 28: The method of any one of Aspects 21-27, further comprising: transmitting a downlink control information (DCI) indicating at least two transmission configuration indicator (TCI) states associated with different bundling sizes for the UE to apply for bundled transmissions.

Aspect 29: The method of Aspect 28, wherein the different bundling sizes comprise: a first bundle size indicated in the DCI for transmissions using a first TCI state; and a second bundle size, indicated via at least one of radio resource control (RRC) or medium access control (MAC) control element (CE) signaling for transmissions using a second TCI state.

Aspect 30: The method of any one of Aspects 28-29, wherein the different bundling sizes comprise: a first bundle size indicated in the DCI for transmissions using a first TCI state; and a second bundle size, derived from a TRS transmission, for transmissions using a second TCI state.

Aspect 31: The method of any one of Aspects 28-30, wherein the different bundling sizes comprise: a first bundle size indicated in the DCI for transmissions using a first TCI state; and a second bundle size also indicated in the DCI for transmissions using a second TCI state.

Aspect 32: The method of any one of Aspects 28-31, wherein the different bundle sizes are configured for the at least two TCI states.

Aspect 33: The method of any one of Aspects 28-32, wherein the different bundle sizes are determined based on a field in the DCI that maps to a vector of bundling sizes for the at least two TCI states.

Aspect 34: The method of any one of Aspects 21-33, further comprising: transmitting TRS to the UE, wherein the network entity transmits the DMRS and TRS with beams that are quasi co-located (QCL'ed).

Aspect 35: The method of Aspect 34, further comprising transmitting the UE an indication of whether or not a same precoder was used for the DMRS and TRS.

Aspect 36: The method of Aspect 35, wherein the indication is transmitted via at least one of radio resource control (RRC), medium access control (MAC) control element (CE), or downlink control information (DCI) signaling.

Aspect 37: A network entity comprising: a memory; and at least one processor, coupled to the memory, configured to perform a method of any one of Aspects 20-36.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a packet-switched (PS) Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication system 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively. The one or more processors (e.g., processors 220, 230, 238, and 240) of the BS 102 are coupled to memory 242, and the one or more processors of the BS 102 can be configured to cause the BS 102 (which may also be referred to as a network entity) to perform the methods described herein such as, for example, the methods discussed with reference to FIGS. 6 and 7. The one or more processors of the UE 104 are coupled to memory 282 and to transceiver 254, and the one or more processors (e.g., processors 258, 264, 266, and 280) of the UE 104 can be configured to cause the UE 104 to perform the methods described herein such as, for example, the methods discussed with reference to FIGS. 5 and 7. When receiving or transmitting various configurations, indications, messages, or data (e.g., RRC, DCI and/or MAC-CE, reference signals, signaling, etc.), the UE 104 may receive or transmit such configurations, indications, messages, or data via the transceiver 254.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As described above, FIGS. 3A-3D depict various example aspects of data structures for a wireless communication network, such as wireless communication system 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of variable tracking reference signal (TRS) densities in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks.

The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a user equipment (UE), the apparatus comprising:
   memory capable of storing computer-executable code;
   a transceiver; and
   one or more processors coupled to the memory and the transceiver, the one or more processors configured to, before receiving a tracking reference signal (TRS) configuration from a network entity:
      monitor for a wideband reference signal (RS) from the network entity, the wideband RS occupying a wider band of frequency resources than a TRS; and
      perform at least one of frequency tracking or timing tracking based on the monitoring.

2. The apparatus of claim 1, wherein the wideband RS comprises a wideband demodulation reference signal (DMRS) transmitted from the network entity using a wideband precoder.

3. The apparatus of claim 2, wherein the one or more processors are further configured to:
   receive, via the transceiver, a radio resource control (RRC) configuration indicating the wideband precoder;
   receive, via the transceiver, a downlink control information (DCI) message scheduling a transmission; and
   receive, via the transceiver, the transmission, wherein the transmission is transmitted by the network with the wideband DMRS using the wideband precoder.

4. The apparatus of claim 1, wherein the monitoring the wideband RS from the network entity is in response to at least one of:
- a synchronization signal block (SSB) subcarrier spacing (SCS) being less than a physical downlink shared channel (PDSCH) SCS; or
- the UE receiving system information (SI) indicating the UE is to use the wideband RS to perform at least one of frequency tracking or timing tracking for an upcoming transmission.

5. The apparatus of claim 1, wherein the one or more processors are further configured to transmit an indication to the network entity that the UE supports timing offset compensation (TOC) using the wideband RS, and wherein the monitoring the wideband RS is in response to transmitting the indication.

6. The apparatus of claim 5, wherein the one or more processors are further configured to:
- receive, via the transceiver, signaling indicating for the UE to perform time refinement based on the wideband RS; and
- in a radio resource control (RRC) connected mode, after receiving the TRS configuration:
  - monitor the wideband RS from the network entity; and
  - perform TOC based on the monitoring.

7. The apparatus of claim 1, wherein the one or more processors are further configured to:
- receive, via the transceiver, a downlink control information (DCI) message indicating at least two transmission configuration indicator (TCI) states; and
- apply different bundle sizes for transmissions using the at least two TCI states.

8. The apparatus of claim 7, wherein the applying the different bundle sizes for the transmissions using the at least two TCI states comprises:
- applying a first bundle size indicated in the DCI for transmissions using a first TCI state of the at least two TCI states; and
- applying a second bundle size for transmissions using a second TCI state of the at least two TCI states, wherein the second bundle size is indicated via a radio resource control (RRC) message, indicated via a medium access control (MAC) control element (CE) message, derived from a TRS transmission, or indicated in the DCI.

9. The apparatus of claim 7, wherein the different bundle sizes are configured for the at least two TCI states.

10. The apparatus of claim 7, wherein the different bundle sizes are determined based on a field in the DCI that maps to a vector of bundling sizes for the at least two TCI states.

11. The apparatus of claim 1, wherein the one or more processors are further configured to, after receiving the TRS configuration:
- monitor for the TRS with one or more beams that are quasi co-located (QCL'ed) with one or more beams used for monitoring for the wideband RS; and
- jointly process the wideband RS and the TRS to perform at least one of frequency tracking, timing tracking, or frequency offset estimation refinement.

12. The apparatus of claim 11, wherein the one or more processors are further configured to refine a frequency offset estimation based on the joint processing.

13. The apparatus of claim 11, wherein the one or more processors are further configured to receive, via the transceiver, an indication of whether or not a same precoder was used for the wideband RS and the TRS, and wherein the indication is received via at least one of: a radio resource control (RRC) message, a medium access control (MAC) control element (CE) message, or downlink control information (DCI).

14. The apparatus of claim 1, wherein the monitoring for the wideband RS from the network entity is in response to the UE being in a radio resource control (RRC) idle or RRC inactive state.

15. An apparatus for wireless communications by a network entity, the apparatus comprising:
- memory capable of storing computer-executable code; and
- one or more processors coupled to the memory, the one or more processors configured to, before transmitting a tracking reference signal (TRS) configuration to a user equipment (UE):
  - transmit, to the UE, wideband reference signals (RS) that occupy a wider band of frequency resources than TRS transmitted by the network entity; and
  - transmit data to the UE after transmitting the wideband RS.

16. The apparatus of claim 15, wherein the wideband RS comprises a wideband demodulation reference signal (DMRS) transmitted from the network entity using a wideband precoder.

17. The apparatus of claim 16, wherein the one or more processors are further configured to:
- transmit a radio resource control (RRC) configuration indicating the wideband precoder;
- transmit a downlink control information (DCI) message scheduling a transmission; and
- transmit the transmission with the wideband DMRS using the wideband precoder.

18. The apparatus of claim 16, wherein the monitoring the wideband RS from the network entity is in response to at least one of:
- a synchronization signal block (SSB) subcarrier spacing (SCS) being less than a physical downlink shared channel (PDSCH) SCS; or
- the UE receiving system information (SI) indicating the UE is to use the wideband DMRS to perform at least one of frequency tracking or timing tracking for an upcoming transmission.

19. The apparatus of claim 15, wherein the one or more processors are further configured to receive an indication from the UE that the UE supports timing offset compensation (TOC) using the wideband RS, and wherein the transmitting the wideband RS is in response to receiving the indication.

20. The apparatus of claim 19, wherein the one or more processors are further configured to configure:
- a first set of one or more user equipments (UEs) that indicate support of TOC using the wideband RS with fewer TRS transmissions than configured for a second set of one or more UEs that do not indicate support of TOC using the wideband RS.

21. The apparatus of claim 19, wherein the one or more processors are further configured to transmit signaling for the UE to perform time refinement based on the wideband RS in a radio resource control (RRC) connected mode.

22. The apparatus of claim 15, wherein the one or more processors are further configured to transmit a downlink control information (DCI) message indicating at least two transmission configuration indicator (TCI) states associated with different bundling sizes.

23. The apparatus of claim 22, wherein the different bundling sizes comprise:
    a first bundle size indicated in the DCI for transmissions using a first TCI state; and
    a second bundle size for transmissions using a second TCI state, wherein the second bundle size is indicated via a radio resource control (RRC) message, indicated via a medium access control (MAC) control element (CE) message, derived from a TRS transmission, or indicated in the DCI.

24. The apparatus of claim 15, wherein the one or more processors are further configured to transmit TRS to the UE, wherein the network entity transmits the wideband RS and the TRS with beams that are quasi co-located (QCL'ed).

25. The apparatus of claim 24, wherein the one or more processors are further configured to transmit an indication of whether or not a same precoder was used for the wideband RS and the TRS, and wherein the indication is transmitted via at least one of a radio resource control (RRC) message, a medium access control (MAC) control element (CE) message, or downlink control information (DCI).

26. The apparatus of claim 15, wherein the transmitting the wideband RS to the UE is in response to the UE being in a radio resource control (RRC) idle or RRC inactive state.

27. A method for wireless communications by a user equipment (UE), the method comprising:
    before receiving a tracking reference signal (TRS) configuration from a network entity:
        monitoring for a wideband reference signal (RS) from the network entity, the wideband RS occupying a wider band of frequency resources than a TRS; and
        performing at least one of frequency tracking or timing tracking based on the monitoring.

28. The method of claim 27, wherein the wideband RS comprises a wideband demodulation reference signal (DMRS) transmitted from the network entity using a wideband precoder.

29. A method for wireless communications by a network entity, method comprising:
    before transmitting a tracking reference signal (TRS) configuration to a user equipment (UE):
        transmitting, to the UE, wideband reference signals (RS) that occupy a wider band of frequency resources than a TRS transmitted by the network entity; and
        transmitting data to the UE after transmitting the wideband RS.

\* \* \* \* \*